July 8, 1952

D. L. TAYLOR 2,602,480

ONION SKINNING AND SLICING MACHINE

Filed April 21, 1948

DAVID L. TAYLOR
*INVENTOR.*

BY *Beale and Jones*

*Attorneys*

July 8, 1952

D. L. TAYLOR 2,602,480

ONION SKINNING AND SLICING MACHINE

Filed April 21, 1948

DAVID L. TAYLOR
*INVENTOR.*

BY Beale and Jones

*Attorneys*

July 8, 1952 D. L. TAYLOR 2,602,480
ONION SKINNING AND SLICING MACHINE
Filed April 21, 1948 10 Sheets-Sheet 3
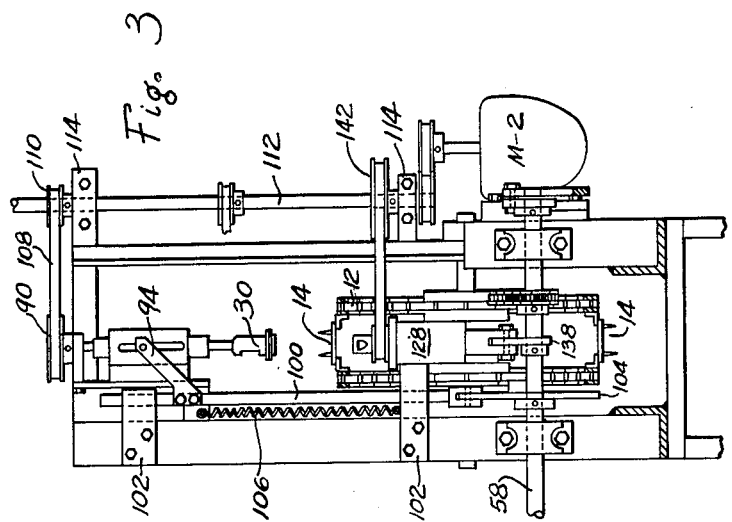
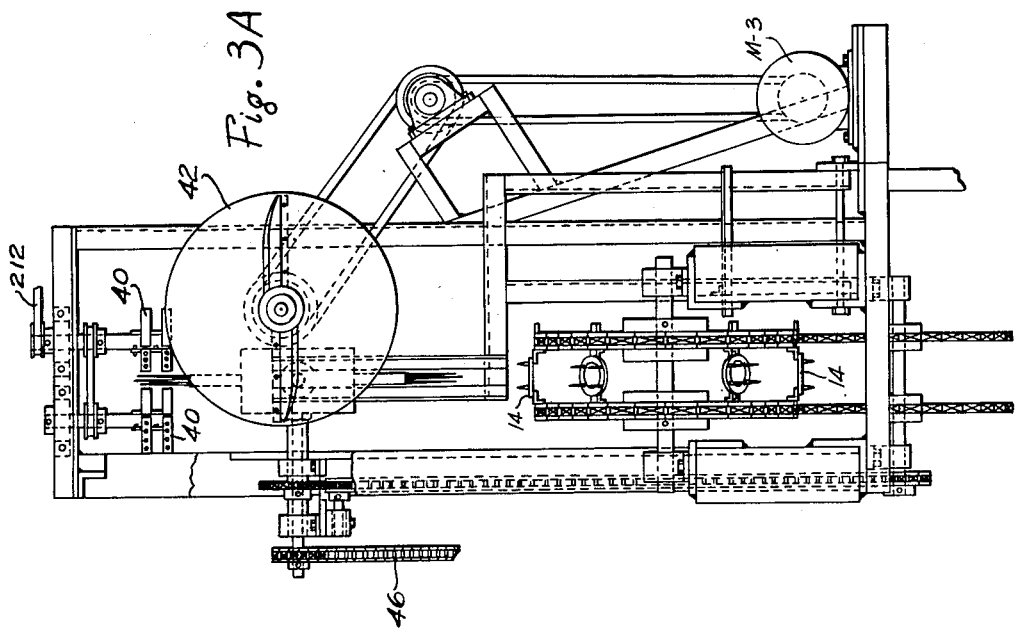
DAVID L. TAYLOR
INVENTOR.
BY Beale and Jones
Attorneys July 8, 1952  D. L. TAYLOR  2,602,480
ONION SKINNING AND SLICING MACHINE
Filed April 21, 1948  10 Sheets-Sheet 4

DAVID L. TAYLOR
*INVENTOR.*

BY Beale and Jones

Attorneys

July 8, 1952 D. L. TAYLOR 2,602,480
ONION SKINNING AND SLICING MACHINE
Filed April 21, 1948 10 Sheets-Sheet 5
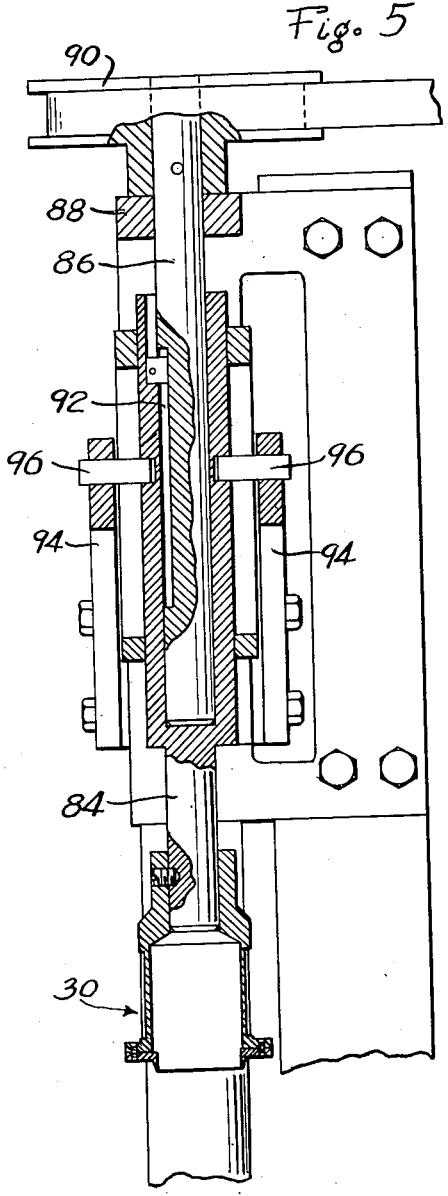
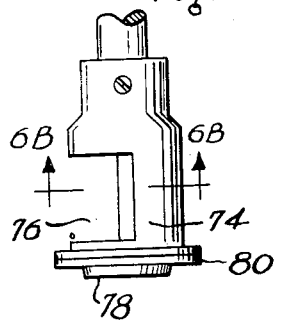
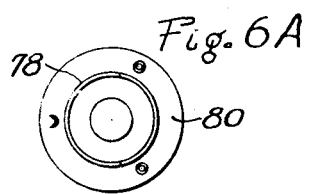
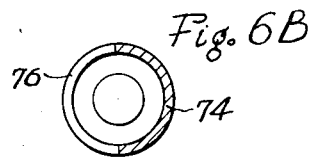
DAVID L. TAYLOR
*INVENTOR.*
BY *Beale and Jones*
*Attorneys*

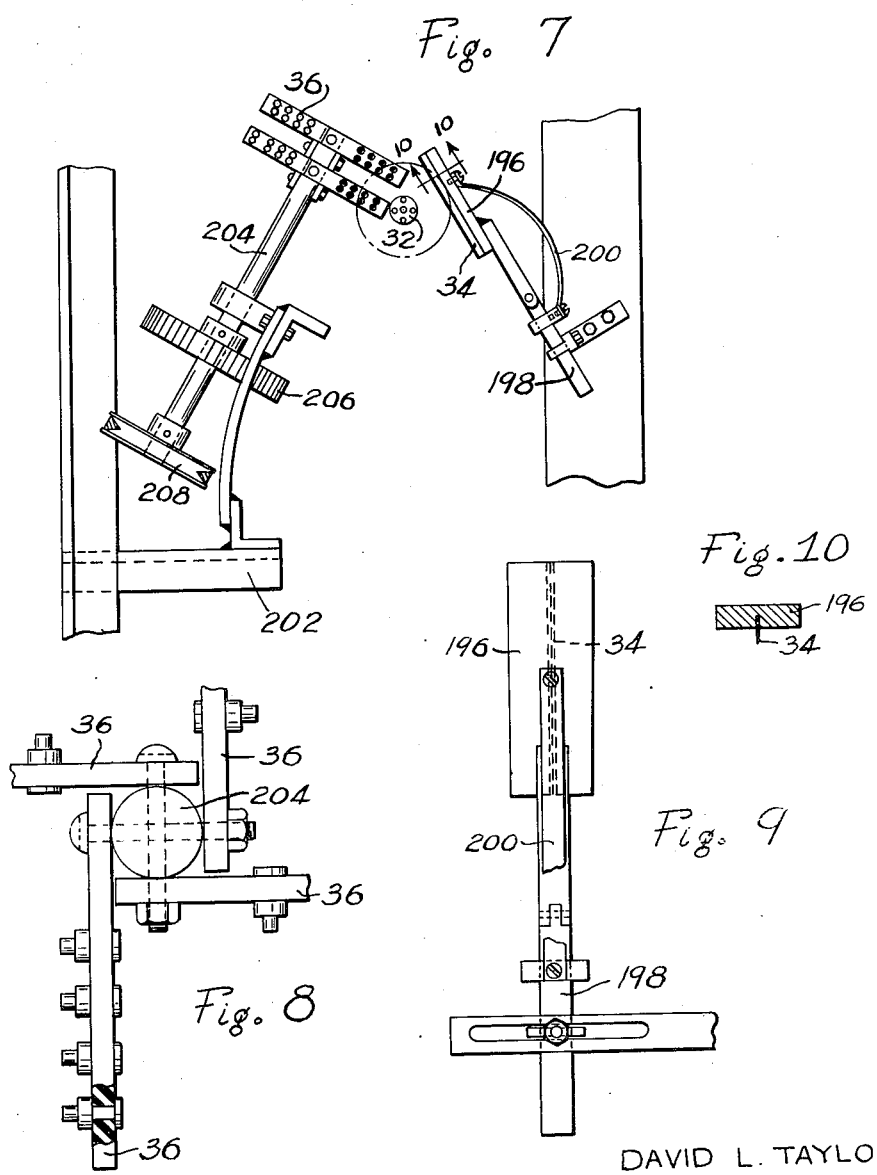

July 8, 1952  D. L. TAYLOR  2,602,480
ONION SKINNING AND SLICING MACHINE
Filed April 21, 1948  10 Sheets-Sheet 7
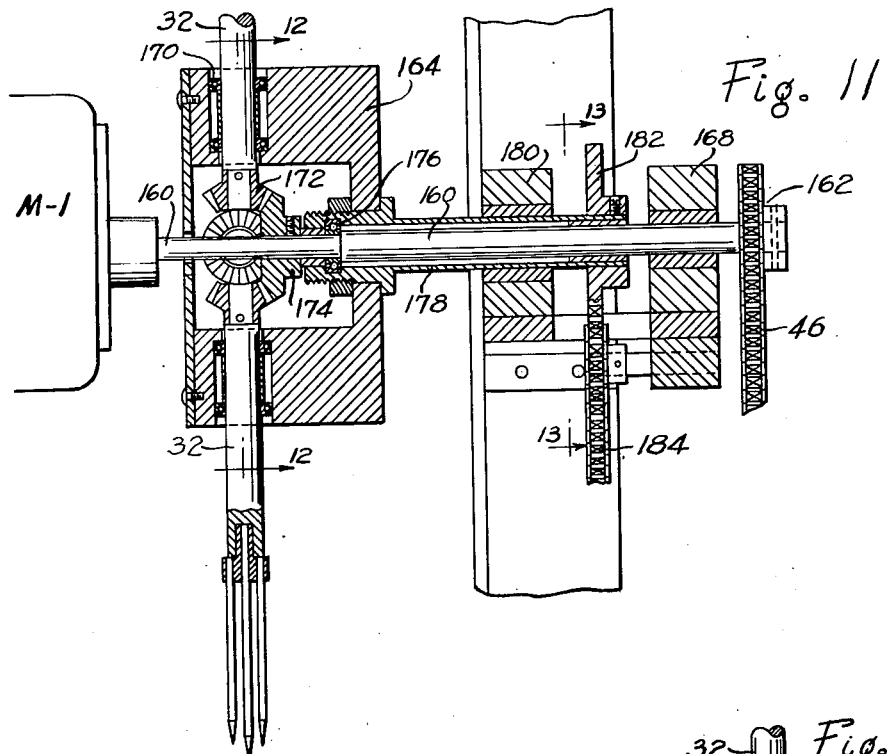
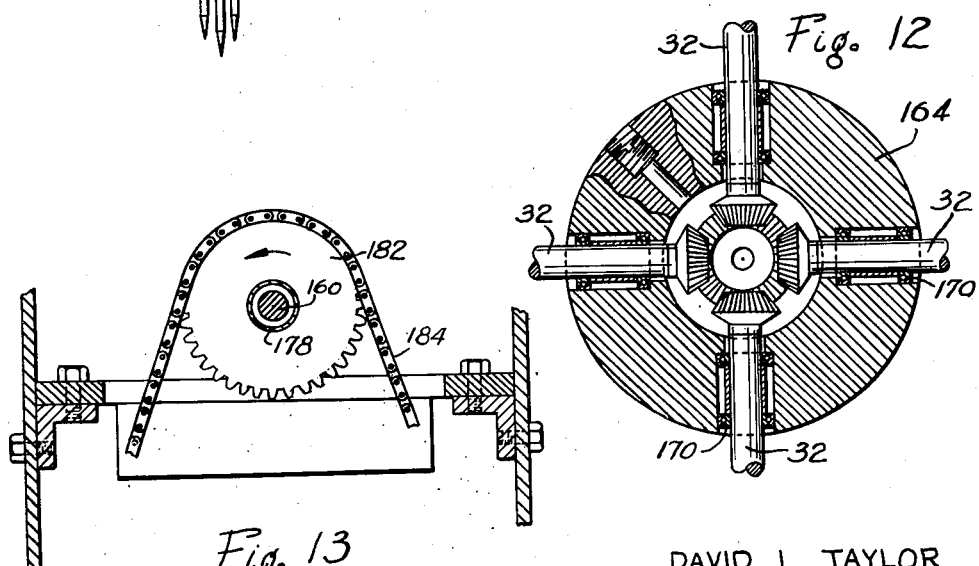
DAVID L. TAYLOR
INVENTOR.
BY Beale and Jones.
Attorneys July 8, 1952  D. L. TAYLOR  2,602,480
ONION SKINNING AND SLICING MACHINE
Filed April 21, 1948  10 Sheets-Sheet 8
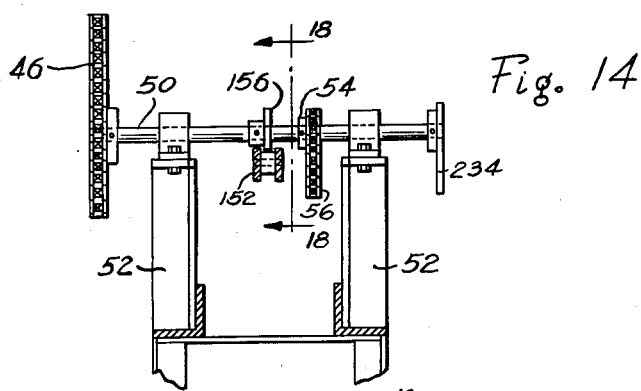
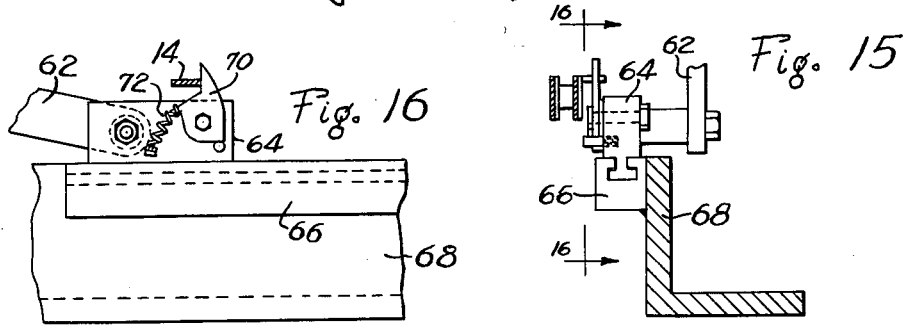
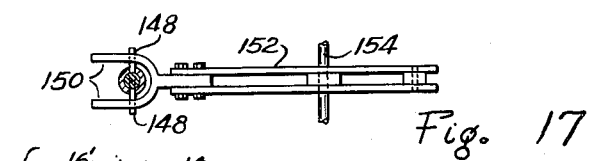
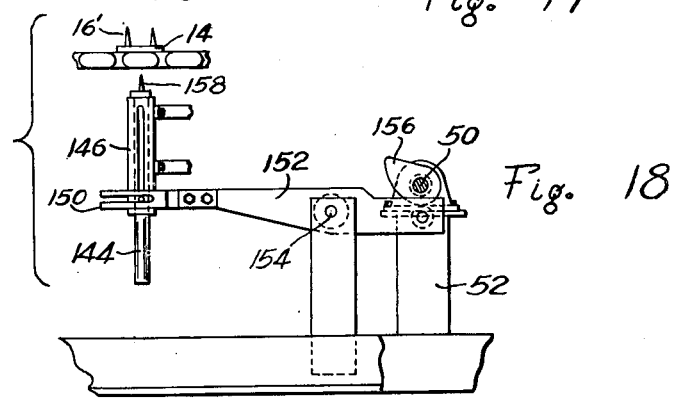
DAVID L. TAYLOR
*INVENTOR.*
BY *Beale and Jones.*
Attorneys July 8, 1952
D. L. TAYLOR
2,602,480
ONION SKINNING AND SLICING MACHINE
Filed April 21, 1948
10 Sheets-Sheet 9
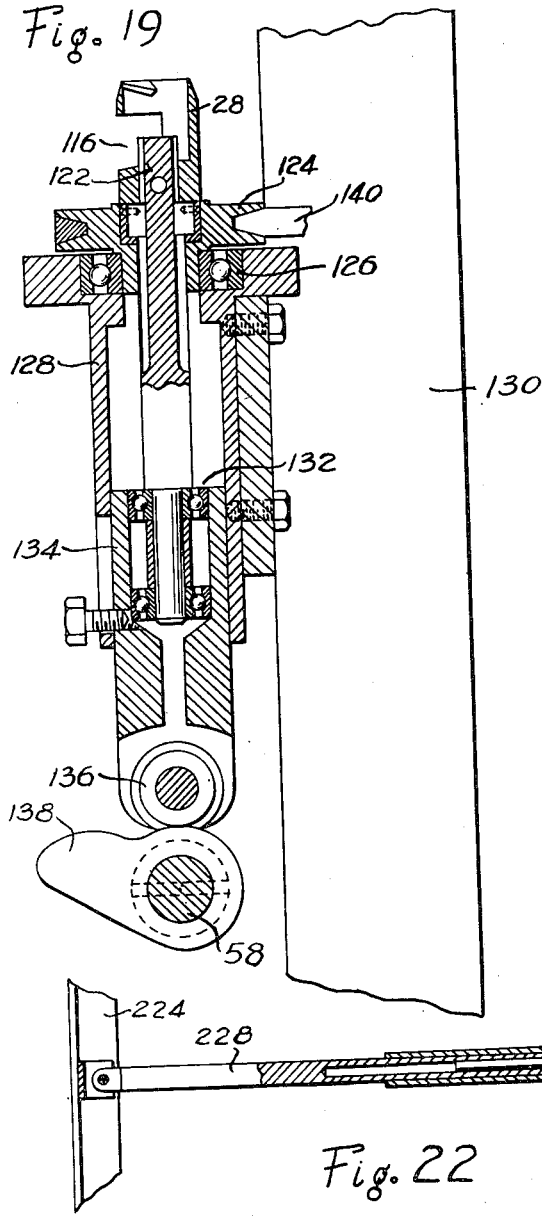
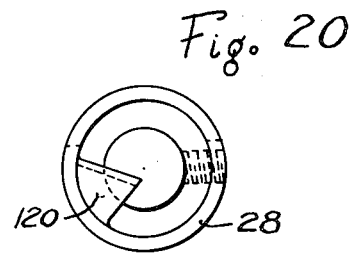
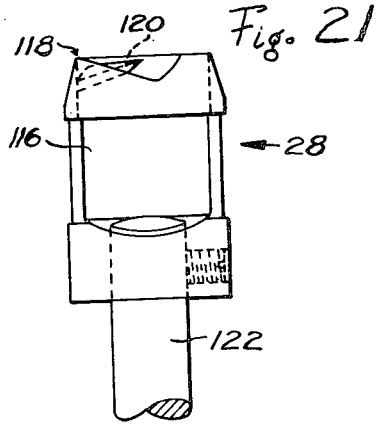
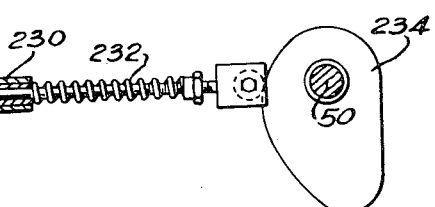
DAVID L. TAYLOR
*INVENTOR.*
BY Beale and Jones
Attorneys July 8, 1952 D. L. TAYLOR 2,602,480
ONION SKINNING AND SLICING MACHINE
Filed April 21, 1948 10 Sheets-Sheet 10

DAVID L. TAYLOR
*INVENTOR.*

BY Beale and Jones

Attorneys

Patented July 8, 1952

2,602,480

UNITED STATES PATENT OFFICE 2,602,480

ONION SKINNING AND SLICING MACHINE

David L. Taylor, Dixon, Calif., assignor to Machinery Development Corporation, Caldwell, Idaho, a corporation of Idaho Application April 21, 1948, Serial No. 22,384

3 Claims. (Cl. 146—37)

This invention relates to a machine for preparing slices of raw onions from raw, whole onions as harvested in their natural state. This invention also relates to a continuous process for preparing onion slices from such raw onions.

With more particularity this invention relates to a continuous method of removing the tops and roots of raw onions, then removing the peel of the topped and root-free onions and then slicing the peeled onions. This invention also relates to a device adapted continuously to transport raw onions to a stage wherein the root of the onion is removed while the top is scored, further transporting the so-treated onion to a second stage where the onion is removed from the initial transporting means and automatically placed upon a second transporting means; while on the second transporting means the onion is moved to a third stage where the skin is scored and part at least of the skin is removed; thence the onion is removed to a fourth stage where the remainder, if any, of the skin is removed and thence the onion is transported to a fifth stage where it is progressively forced against a slicing blade and sliced into slices of desired size.

While the overall operation of my device is continuous, the movement of each onion from stage to stage is intermittent; that is to say, that while this device permits onions to be transported from the feed end of the device through and to the slicing of the onion and the collection of the slices, in a continuous manner, the movement of each onion from linear viewpoint is arrested at each of the aforesaid stages for a period long enough to permit the desired operational steps to be performed on the onion. Moreover, the intermittent motion of each element which advances the onion from stage to stage is coordinated with all other elements of the device in accordance with the predetermined manner of operation.

I am aware that certain efforts have been made to process onions in commercial quantities by means of machines adapted to perform certain functions on the onions but so far as I am aware no prior machine has been designed which performs all the steps of top scoring, removing the root, removing the peel, and slicing the onion, entirely automatically. Some previous devices have been adapted to remove either the onion top or the onion root automatically, but not followed by the other and final steps required to produce sliced onions. I am aware of no process by which onions are automatically sliced, starting with the raw, harvested vegetable and continuing through the steps of forming peeled, sliced onions continuously without manually handling the onions at any stage.

In addition to the relatively broad principles of both device and process, as described above, there are certain combinations of features which so far as I am aware are novel with this device. Thus there is provided an arrangement for transporting by substantially linear movement a plurality of onions, arresting the linear movement, intermittently, and long enough to perform the two substantially simultaneous operations of scoring the onion top and removing the onion root. There is, moreover, an arrangement for removing each onion from the initial conveyor and affixing the onion to a second conveyor adapted to transport the onion through successive stages of peeling and slicing. There is, moreover, an arrangement for scoring the onion peel and automatically removing the peel by mechanical means which may or may not be supplemented by air or steam pressure. Other features will be pointed out as the description of the device and the process follow.

With reference to the drawings:

Fig. 2 is a rear elevation of the same,

Figure 1:
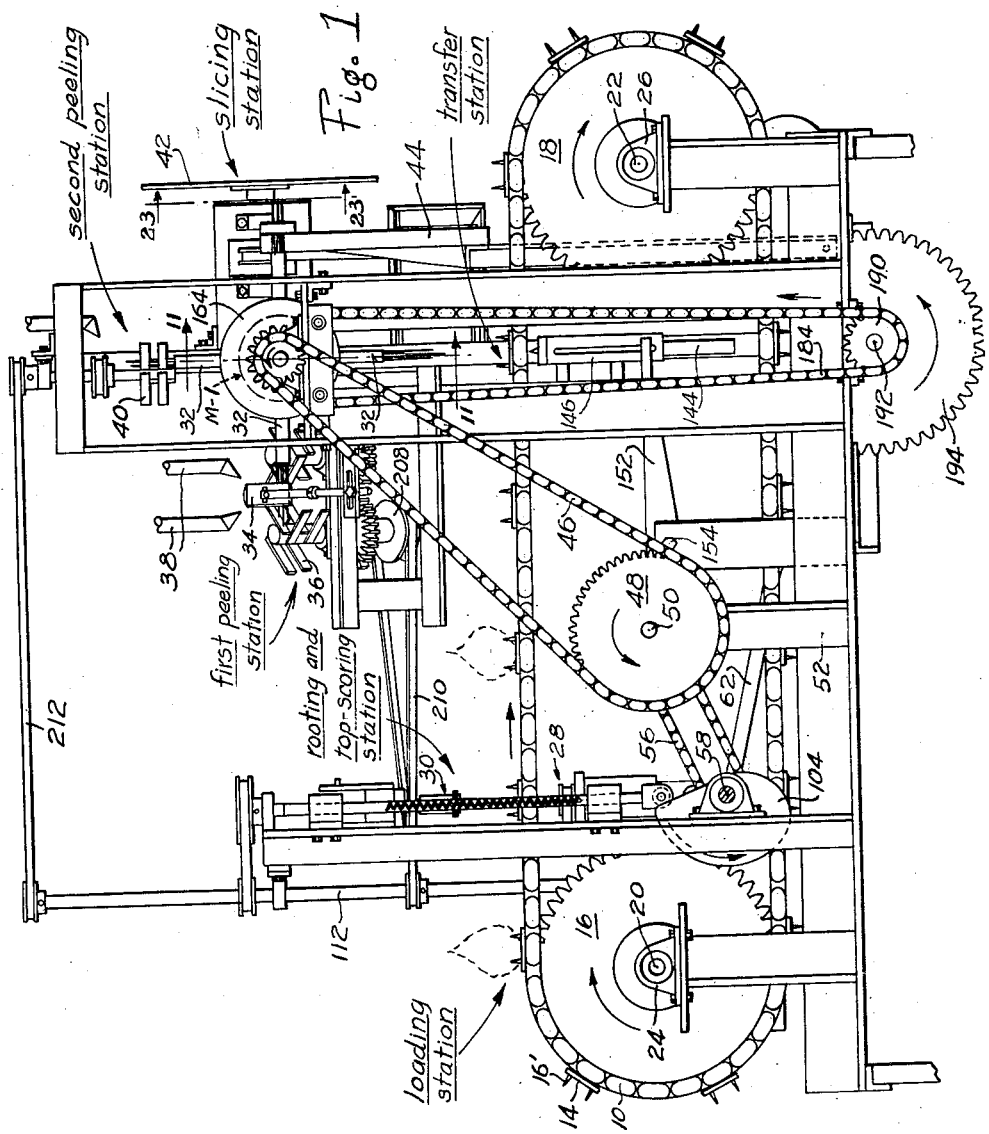
Fig. 1 is a front elevation of the complete machine.
Figure 4:
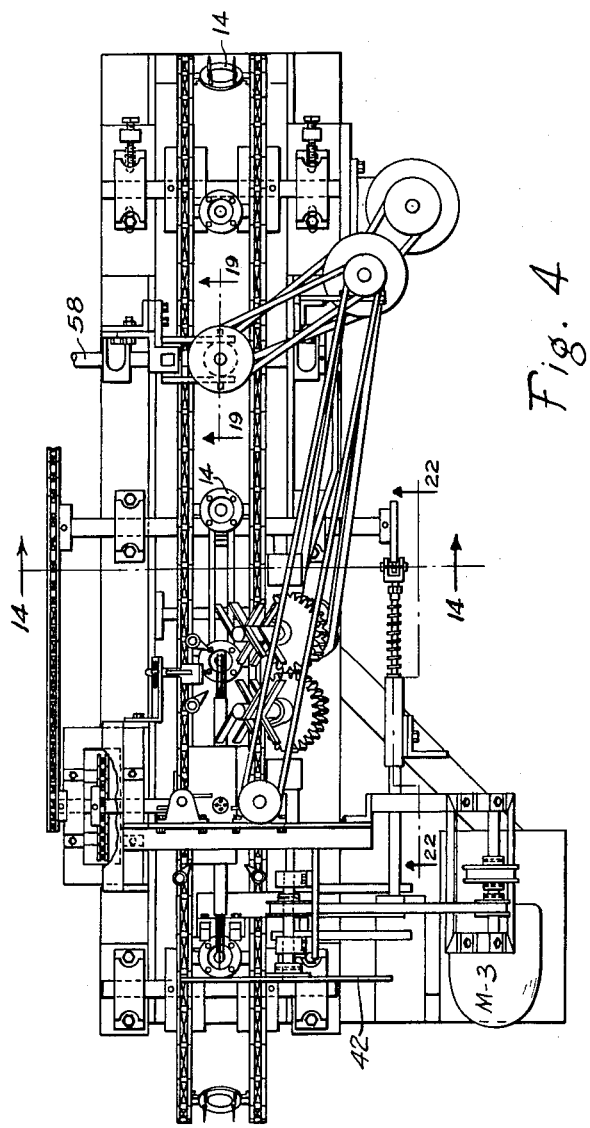
Figure 23:
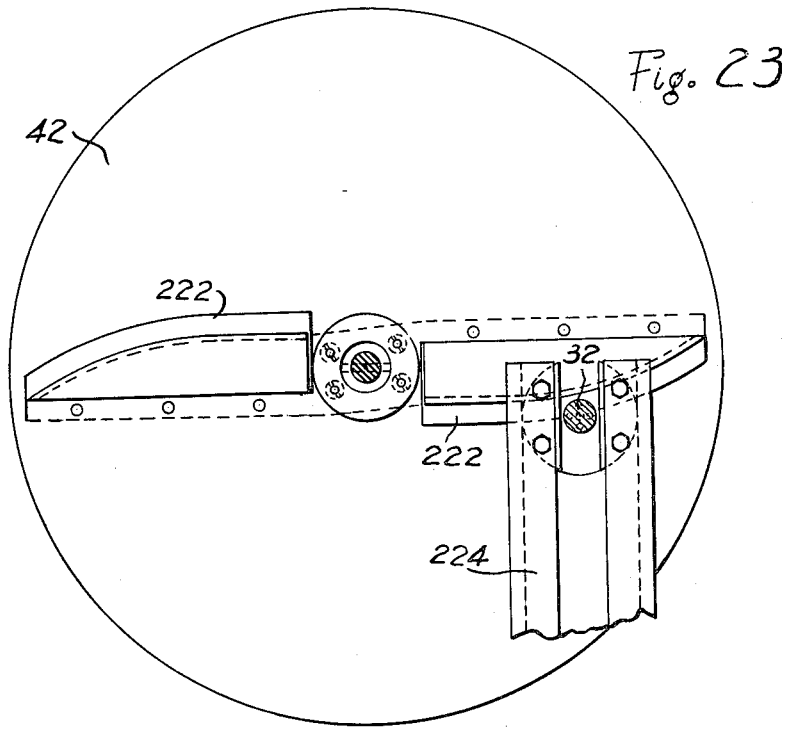
Figure 24:
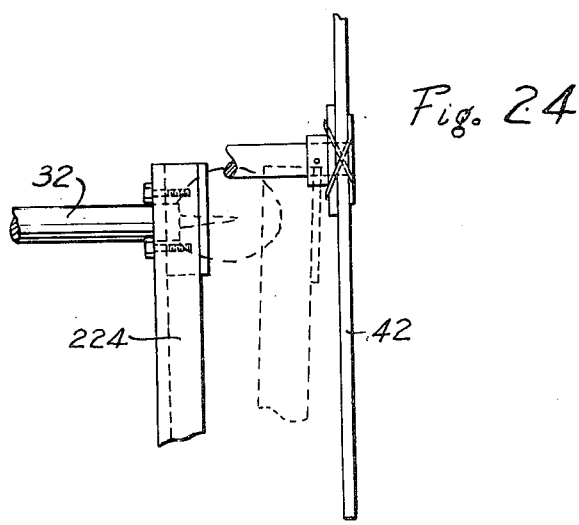

Figs. 3 and 3A are end elevation views, looking toward the feed end and the discharge, or slicing end, of the machine, Fig. 4 is a plan view, Fig. 5 is an enlarged fragmentary view, partly broken away and partly in section, of the onion top scoring portion of the machine, Figs. 6 and 6A are respectively a fragmentary elevation view, and an end view, of the top scoring device, Fig. 6B is a sectional view taken on line 6B—6B of Fig. 6, Fig. 7 is an enlarged, fragmentary elevational view of the parts at the first peeling station, including the peel-scoring knife and one set of flexible peeling fingers, Fig. 8 is a plan view looking down upon the peeling fingers of Fig. 7, Fig. 9 is an elevational view of the peel-scoring knife assembly of Fig. 7, Fig. 10 is a sectional view taken on line 10—10 of Fig. 7, Fig. 11 is a enlarged fragmentary sectional view of the spider or turret assembly, taken on line 11—11 of Fig. 1, Fig. 12 is a sectional view taken on line 12—12 of Fig. 11, Fig. 13 is a sectional view taken on line 13—13 of Fig. 11, Fig. 14 is a sectional view taken on line 14—14 of Fig. 4, Fig. 15 is a fragmentary sectional view taken on line 15—15 of Fig. 2, Fig. 16 is a sectional view taken on line 16—16 of Fig. 15, Fig. 17 is a fragmentary horizontal sectional view taken on line 17—17 of Fig. 2, Fig. 18 is a sectional view taken on line 18—18 of Fig. 14, Fig. 19 is a fragmentary, enlarged vertical sectional view of the root-cutting assembly of the machine, the plane of section being indicated by numerals 19—19 in Fig. 4, Figs. 20 and 21 are respectively plan and side elevation views, to a larger scale, of the cutter element of Fig. 19, Fig. 22 is an enlarged vertical sectional view taken on line 22—22 of Fig. 4 of the drawings, Fig. 23 is a sectional view taken on line 23—23 of Fig. 1, and showing the rotary slicing knife in elevation, and Fig. 24 is a fragmentary view, looking at the right end of Fig. 23, and illustrating the action of the crowder element which forces an onion against the rotary slicing knife.

In view of the fact that the machine to be described hereinafter has a considerable number of separate parts which make up the various operative stations mentioned at the outset of the specification, an understanding of the invention will be facilitated by a preliminary general description of the organization of the machine. Thereafter, under appropriate headings, the details of construction of the various individual stations will be explained.

General organization

The layout of the major parts of the machine is best shown in Fig. 1 of the drawings, to which legends have been applied to aid in identifying the various stations at which particular operations upon the onions are effected. As shown in that figure, there is provided a main or horizontal conveyor comprising a pair of chains or link belts, of which the one visible in Fig. 1 is designated by reference numeral 10. The other chain parallels chain 10 and lies directly behind the same in Fig. 1, and is designated 12 in Figs. 2 to 4. At spaced points along the lengths of the chains, they are bridged by plates 14 which are provided with upstanding spikes 16' surrounding a central aperture in each plate, so that an onion can be impaled upon the spikes, as at the loading station indicated in Fig. 1, and will be carried along by the conveyor to the rooting and top-scoring station. The conveyor chains 10 and 12 are driven by sprocket wheels such as indicated at 16 and 18 for chain 10 in Fig. 1, the sprocket wheels for this and for the other chain being secured for rotation with end shafts 20 and 22 carried as in bearing blocks 24, 26 mounted upon vertical posts or pedestals at the respective ends of the machine.

Onions are loaded upon the conveyor with their root ends supported by the plates 14 and their tops extending upward, and are carried to the first operative station, which comprises root cutting and removing elements and a top-scoring assembly. The motion of the conveyor is discontinuous or intermittent, and the periods of cessation of conveyor movement are utilized to permit the various functions to be carried out upon the onions carried thereby. Thus, when the conveyor stops to place one onion at the first station, a rotary root cutting knife element 28 rises from between the conveyor chains, and its upper end passes through the aperture in the carrying-plate 14 so that the cutting end cuts and removes the root portion of the onion, as will be described later in detail. At the same time, a top-scoring knife 30, generally in the shape of a sharpened tubular knife rotated at high speed, descends from above the onion to score the top of the onion in the region surrounding the top of the same. These two vertically-reciprocating cutter units are timed to engage the onion at about the same time, so that the onion is not displaced from its impaled condition on the carrying plate 14, and the cutter elements are retracted before the conveyor resumes its movement.

Successive advances of the belt conveyor ultimately bring the onion from the first station to the transfer station, at which means are provided for raising the onion off its carrying plate and impaling it upon one of a set of spindles 32 which radiate from a central gear assembly. These spindles revolve upon their own axes, and thereby impart rotation to the onions carried thereby, but the spindles also partake of an intermittent rotation in the vertical plane, in the manner of the spokes of a wheel. Thus, an onion impaled upon one spindle 32 is, during the next cycle of advance of the main conveyor, swung upwardly in a vertical arc until it arrives at the first peeling station indicated in Fig. 1. Here, the onion (which is spinning due to the rotation of the spindle carrying it) is caused to engage with a relatively fixed blade 34 which scores its peel along an equatorial line (the onion top-to-root axis being lengthwise of the spindle), and at the same time the skin, or a major portion thereof, is removed by the combined action of a set of flexible straps 36 which are whirled at high speed in contact with the skin. Steam jets 38 assist in the removal of the skin.

A further cycle of advance of the main conveyor rotates the set of revolving spindles through a further angle (which is 90° in the case where four spindles form the spider or turret, as illustrated), and the onion leaving the first peeling station arrives at the second peeling station where it engages a second set of rubbing or erasing straps 40 also whirled in contact with the onion skin, and again steam jets may be provided to assist in removing the last remaining skin, if any still adheres to the onion. Since the peel at the top of the onion has already been scored by the annular cutter unit 30 mentioned above, one or the other of the sets of erasing straps will readily remove all of the peel.

The next cycle of movement of the main conveyor rotates the spider or spindle an additional 90° and places the end of the onion on the spindle just behind the cutting or slicing knife 42 which also rotates rapidly, and a "crowder" arm 44 is swung behind the onion to force the end thereof against the rotary knife 42 to slice the onion into rings which are collected in a suitable receptacle. This crowder element thus slides the onion gradually off of the spindle upon which it was impaled, and when the slicing has been completed, the crowder strips the remaining top end of the onion off of the spindle and allows it to be discharged to a waste receptacle.

From the above general description, it will be seen that the machine described actually employs both a chain conveyor and a rotary spoke conveyor, the onions being transferred from the former to the latter at one stage of the operation. The reason for this arrangement, which is an important feature of the invention, is that certain of the required operations are best carried out when the onion being treated is relatively stationary, as at the rooting and top-scoring station, because the parts being acted upon are located at distinct regions of the onion considered as a vegetable, namely at the polar regions thereof; these regions are properly located with respect to the top-scoring and rooting cutters by the act of impaling the onion upon its carrying plate. When the onion arrives at the transfer station, it is automatically impaled upon a rotating spindle with its bottom, from which the root has been excised, disposed radially outward from its top, so that the peel is accessible to the stripping or peeling fingers at the first and second peeling stations, and, at the slicing station, the de-rooted bottom end of the onion is presented to the rotary slicing knife, so that it is sliced into rings rather than into random pieces.

If it were attempted to operate upon an onion carried upon the carrying plates 14 with devices such as the flexible rubbing straps 36 and 40, the onion would be dislodged, because it cannot be firmly impaled upon a central spike on these plates. The reason for this is that the central part of the plates 14 must be apertured to admit the rooting cutter from beneath. When, however, the onion has been rooted and has had its top scored, then it is perfectly feasible to impale it upon a central spike or spikes such as those carried by the spindles 32. The spindle assembly has the advantage that the onion can then be carried from station to station in a very simple manner, and the desired spinning motion thereof achieved by very simple mechanism, so that all sides of the loosened peel are presented to the action of the rubbing or peeling straps. At the last station, of course, the onion is automatically presented in proper orientation for slicing in the desired manner, without any further complication or adjustment.

Belt conveyor drive

Power for advancing the main conveyor belts 10 and 12 intermittently is derived from a motor M–1 (Figs. 1 and 2) mounted upon a suitable supporting framework and having its drive sprocket wheel connected by a chain or link belt 46 with a sprocket wheel 48 secured to a cross-shaft 50 carried as in journals or bearings supported by pedestals 52 at opposite sides of the machine. As best shown in Fig. 14, this cross shaft 50 also has secured thereto, intermediate the pedestals 52, a smaller sprocket wheel 54 which meshes with a sprocket chain 56. The latter in turn drives a sprocket wheel secured to a second cross shaft 58 disposed beneath the first, or rooting and top-scoring, station. Referring to Fig. 2 of the drawings, one outer end of this cross shaft 58 carries a crank 60 to which is pivoted a link 62 carrying at its rearward end a slide 64 best shown in Figs. 15 and 16 as arranged to slide along a guide 66 secured to a longitudinal frame member 68 of the machine framework, the sliding motion being parallel to the conveyor chain 12. The slide 64 has pivoted thereon a finger or dog 70 which extends upwardly between the two chains 10 and 12, and which upon back and forth movement of link 62 engages behind, and pulls forward, one of the successive carrying plates 14 (which are connected between the chains as already described), thus moving the system of conveyor chains intermittently in the same direction. The dog 70 is pressed upwardly by a spring 72, so that during return movement of the slide, it can move beneath the next successive carrying plate 14.

Top scoring knife

Referring now to Figs. 1, 2, 3 and 5, means are shown for giving the required downward motion of the top scoring knife unit 30, in timed relation so that it moves downwardly only when a carrying plate 14 (with an onion impaled thereon) has arrived at the first station of Fig. 1. To this end, and as best shown in Figs. 5, 6, 6A and 6B, the top scoring knife is in the form of a sleeve 74 having a side opening 76 and a sharpened lower edge 78. Above the edge 78 is a ring 80 which prevents the top scoring cutter edge from cutting too far into the body of the onion. It is not necessary that, at this stage, the entire stem portion be removed, as this will be accomplished or completed at a later stage, being facilitated by the scoring just described.

The cutter unit is secured upon a rod or quill 84 whose upper end is bored to receive slidably a shaft 86 carried in a bearing 88 and secured to a pulley 90. There is a splined or keyway connection between the shaft 86 and the quill 84, as indicated by numeral 92, so that rotation of pulley 90 will impart rotation to the quill 84 and the cutter unit, while the latter can slide endwise on the shaft under the influence of two bracket arms 94 carrying pins 96 received in holes in the upper end of the quill. Referring now to Fig. 3 of the drawings, these bracket arms are shown as carried by a vertical rod 100 slidable in bearings or guides 102 and having its lower end in contact with a cam 104 on cross shaft 58, which of course rotates in timed relation with the motion of the conveyor chains, since the latter are driven by the crank 60 which is also on shaft 58. A spring 106 (Fig. 3) acts to ensure the downward motion of the top scoring unit when permitted by rotation of the cam 104.

Inasmuch as the rotation of the top scoring knife about its axis (as represented by quill 84) need not be synchronized with the advance of the conveyor chains, the drive for pulley 90 may comprise a simple belt 108 passing around a pulley 110 carried at the upper end of a vertical shaft 112 carried in guides 114 and having a pulley at its lower end belted to the drive pulley of a second motor M–2. Preferably, the belting and motor speed are so arranged that the cutter unit 30 rotates at a speed, for example, of the order of 4,000 revolutions per minute.

Rooting cutter

The rooting cutter 28 referred to above, and shown in general in Fig. 1 of the drawings, is also in the form of a rotary, tubular cutter, and is arranged to move upwardly into the aperture in each carrying plate 14 in timed relation to the descent of the top scoring cutter 30 as just described. To this end, and as best shown in Figs. 3, 19, 20 and 21, the cutter 28 may comprise a tubular member having a side opening 116 (through which the excised root portion is ejected) and a bevelled cutting edge 118 is formed at the upper extremity. Mounted radially at one portion of the interior of the cutter is a wedge-shaped cutting blade 120 which is inclined from the point of its connection with the tubular member. As the cutter is urged upwardly into contact with the root (under) end of an onion on a carrying plate 14, rotation of the cutter cuts into the onion and removes the root portion therefrom. Fig. 19 illustrates mechanism by which the cutter is allowed to rotate continuously, for example at a speed of about 3400 R. P. M.; the cutter itself is carried by a shaft 122 having a splined or keyway connection with a pulley 124 carried in a bearing 126 supported by a bracket or sleeve 128 fastened to an upright frame element 130. The shaft 122 may have a lower bearing 132 within a sleeve 134 slidable in sleeve 128, a pin and slot connection preventing the sleeve 134 from rotating when the pulley 124 is driven. At the lower end of sleeve 134, a cam follower 136 contacts a cam 138 also on cross shaft 58, and a spring (not shown) may obviously be provided, if desired, to ensure downward movement of the cutter after the root portion of the onion undergoing treatment has been removed.

The belt 140 driving pulley 124 is connected, as shown in Figs. 2 and 4, to a pulley 142 secured to the same vertical shaft 112 which carries the drive pulley 110 for the upper cutter 30.

Transfer station

After onions carried upon the plates 14 have been subjected to the rooting and top-scoring operations as just described, further intermittent movements of the conveyor chains 10 and 12 carry the same to a point (indicated in Fig. 1 by the legend "transfer station") at which the carrier 14 is disposed just above an ejector shaft 144 received within a sleeve 146 fixedly mounted on the framework. The shaft 144 is arranged to be moved upwardly by reason of engagement between a pair of pins 148 thereon engaging between the slotted arms of a yoke member 150 (see Figs. 17 and 18) carried by a rocker arm 152 pivoted to the frame as at 154 and having its other end in engagement with a cam 156 fast on cross shaft 58. A spring (not shown) may be provided within sleeve 146 to ensure rapid downward travel of the ejector shaft 144 when permitted by cam 156. Thus, and since shaft 50 is synchronized with the movement of the conveyor chains, each time an onion on a carrier plate arrives at the transfer station, the ejector shaft 144 rises, and its spiked upper end 158 impales the onion and lifts it from its carrier plate 14, thrusting it upward against the spiked end of whichever one of the spindles 32 is pointed downwardly at that time.

As has been stated, the assembly of the rotating spindles 32 is driven in timed relation to the motion of the conveyor chains 10 and 12, so as to rotate a quarter turn for each cycle of advance of the main conveyor, and thus to present one of the (four) spindles 32 to receive an onion from the transfer mechanism each time an onion arrives at that point. The means by which this is accomplished are best shown in Figs. 1, 11, 12 and 13 of the drawings. Referring first to Fig. 11, it will be seen that motor M-1 has a shaft 160 whose outermost end carries the sprocket wheel 162 which drives chain belt 46, this drive powering the conveyor chains 10 and 12, and the cross shafts 50 and 58 as already described. The continuously moving motor shaft 160 passes loosely through a differential housing 164 and is supported by bearing 168 secured to a vertical frame member. The spindles 32 are journalled in the differential housing 164 (see also Fig. 12) as at 170, and the inner end of each spindle is secured to a bevel pinion 172, all of which mesh with a common bevel gear 174 secured on shaft 160. Thus, the continuous rotation of the motor shaft drives the respective spindles continuously about their own axes, regardless of the position occupied by the differential housing 164.

The differential housing 164 is journalled upon the motor shaft 160 as at 176, and is also rotatably supported by a sleeve 178 secured to the housing and extending into a bearing 180 on the vertical frame member. In order to provide for the periodic, timed rotation of the housing, and hence of the spindle assembly, this sleeve 178 has secured to its outer end a sprocket wheel 182 (Fig. 13) which engages with a sprocket chain 184 and which chain extends downwardly, as shown in Fig. 1, and wraps around a sprocket wheel 190 suitably journalled on the framework as by a shaft 192 which carries a sprocket wheel 194 disposed to engage with the lower pass of the conveyor chain 10. The chain 184 thus is moved in timed relation to the movement of the conveyor chains, and the gearing is chosen so as to provide a quarter turn of the spindle assembly for each cycle of advance of the conveyor chains.

First peeling station

As will be seen by referring to Fig. 1, the first quarter-turn of the differential housing 164 (and hence of the spindle assembly) will bring the onion which has just been impaled on a spindle to the first peeling station, comprising the scoring knife 34 and the whirling belts or straps 36. The arrangement of these parts is shown in Fig. 7, wherein the scoring knife 34 is shown as carried by an arm 196 pivoted to another arm 198 supported on a frame member, a spring 200 serving to urge the knife edge against an onion carried on the spindle 32, and due to the spinning of the spindle and onion, scoring the onion skin on an equatorial line. Carried by a suitable framework member 202, and inclined to the vertical, is a pair of shafts 204 geared to one another as by gears 206, and one of said shafts being fast to a pulley 208 connected by a belt 210 to a pulley on the constantly moving shaft 112 of Figs. 1 and 2. Each of the shafts 204 carries at its upper end a series of flexible straps 36 (see also Fig. 8), having buttons or like elements adapted, as the shafts are rotated, to strike against the scored peel of the onion and remove most if not all of such peel. The steam jets 38 of Fig. 1 aid in this action.

It will be noted that, as shown in Fig. 7, the inclination of the knife 34 and its carrying structure, and the inclination of the shafts 204 carrying the straps 36, are such that together they converge to form an entrance area toward which the onion approaching this station travels as the spindle assembly rotates. At the next rotation of the spindle assembly, the peeled or nearly peeled onion is permitted to travel on upwardly by the flexible nature of the straps, and the springy nature of the mounting arm for the scoring knife. This upward motion finally brings the onion to the

Second peeling station

The mechanism at the second peeling station has not been detailed in the drawings, but as shown in Figs. 1, 2 and 3A, it comprises a pair of shafts geared together as in the case of the first peeling station; in this case, however, the shafts are disposed on opposite sides of the path of travel of an onion on the spindle 32, as clearly shown in Fig. 3A. The rotation of these shafts, and the straps 40 carried thereby, is caused by a belt connection 212 between one of the shafts and a pulley 214 on the vertical shaft 112. The onion thus arrives between the sets of erasing straps 40 at this station, and is subjected to further peeling action. Steam jets may also be employed at this station, if desired or necessary, one of these being shown in Fig. 1 of the drawings.

Upon the next cycle of movement of the main conveyor chains, the onion just treated at the second peeling station moves in a downward arc for a distance of 90°, and thus comes to lie just behind the rotary slicing knife 42 (Fig. 1), whose structure and arrangement are better shown in Figs. 2, 3A, 23 and 24. This knife is in the shape of a disc, suitably journalled on framework elements, and driven by a belt 216, countershaft assembly 218, belt 220, and a third motor M-3 (Fig. 2). The face of the disc (Fig. 23) has a pair of slots adjacent which the knife edges 222 are positioned, so that rings sliced from an onion are discharged through the disc and into a suitable receptacle. As the spindle 32 travels downwardly from the second peeling station, the onion carried thereby moves into a position indicated in Fig. 24, between the slicing disc 42 and a rocker arm or "crowder" 224, which is bifurcated at its upper end to receive the spindle 32. This crowder arm is pivoted at its lower end, as indicated at 226 in Fig. 2, and is moved toward and away from the slicing disc by a rod 228 passing through a suitably supported sleeve 230 and urged against the tension of an encircling retraction spring 232 by a cam 234 on cross shaft 50. Fig. 22 of the drawing shows this rod and cam in greater detail.

As the crowder arm 224 pushes the onion against the slicing discs 42, rings are sliced therefrom and drop through the disc, the fowardmost position of the crowder arm being shown in dotted lines in Fig. 24. The cam 234 is so shaped that it holds the crowder arm in this position until the next cycle of movement of the spindles has commenced, and the spindle 32 has been stripped of the onion that was impaled thereon. The spindle 32, bare of any onion, then travels in a downward arc (permitted by the bifurcate end of the crowder arm), and the crowder arm retracts in position to receive the next spindle and to operate upon the next onion to be sliced. The residual top portion of the sliced onion drops clear to a suitable waste receptacle as soon as crowder arm 224 leaves the disc 42.

From the foregoing it will be seen that I have devised a machine in which harvested onions containing tops, roots and peels may be rapidly processed in such a manner as to remove the roots and part of the tops with a minimum of waste and thereafter continuously and automatically peeled following which the peeled and fully processed onion is rapidly and automatically sliced. This device does away with uneconomical and cumbersome hand peeling and slicing of onions and avoids the difficulties encountered with the certain prior devices which were designed merely to remove the onion tops or the onion roots. Heretofore it has been necessary to peel the onions by hand and frequently to remove both roots and tops by hand. In my device human hands never touch the processed onion, the only contact with the onion is in the initial step of placing the onion on the conveyor at which time, of course, it is enclosed in its natural peel which in my device it later completely and sanitarily removed. While variations may be made in the manner of operation of the device I have found that a suitable operational speed with the modification shown in Figures 1 and 2 of the drawings involves about 40 cycles of operation per minute; that is, the movement of the conveyor chains and the other elements synchronized therewith is alternately arrested and resumed about 40 times each minute. Thus, the device is capable of processing 40 onions a minute, an accomplishment which is much superior to the prior art production of sliced onions. Another distinct advantage of my device is that the plates 14 and the spider tips 32 require no adjustment in handling onions of heterogeneous and constantly varying sizes. Likewise the top-removing and root-removing blades and the onion peeling elements require no adjustment for onion size.

I claim:
1. Apparatus for preparing sliced, peeled onions, comprising a pair of conveyor chains, means mounting said chains for movement in spaced-apart parallel paths, a plurality of onion-carrying plates connecting said chains across the intervening space and each having a central aperture and spikes disposed about said aperture to engage an onion carried by said plate and support the same with its axis perpendicular to said plate, the paths of said chains being such that said plates travel in a horizontal path with said spikes extending upward for a portion of their travel, power means for intermittently moving said chains and said carrying plates to carry onions on said respective plates along said horizontal path, upper and lower rotating cutter elements mounted vertically above and below said horizontal path and in alignment with one another, power means synchronized with the movement of said conveyor chains for driving said cutter elements into engagement with the top and bottom of an onion on one of said carrying plates during periods when said conveyor chains are stationary, the lower cutting element passing through the central aperture in said carrying plate, a rotating spindle having a spiked end mounted above said conveyor chains at a point spaced beyond said cutter elements, means mounting said spindle for rotational movement about a horizontal axis, means for rotating said spindle intermittently about said horizontal axis in time relation to the movement of said conveyor chains, a vertically reciprocable ejector rod beneath said horizontal path and directed towards the aperture in the carrying plate thereabove, means for raising said ejector rod during periods of rest of the carrying plate above the same to transfer an onion from said plate to axially impaled condition on said spindle, peeling mechanism disposed in the path of the onion impaled on said spindle as said spindle swings upwardly, and means for continuously rotating said spindle about its own axis to subject said impaled onion to peeling action from different directions.

2. The apparatus in accordance with claim 1, including a rotary slicing disc, means for rotating said disc about an axis perpendicular to, but coplanar with, the axis of rotational movement of said spindle, a crowder arm disposed to engage behind an onion impaled on said spindle, and means for moving said crowder arm to force said onion off said spindle and against the face of said slicing disc, said last-named means being timed to operate during one of the rest periods in the intermittent swinging movement of said spindle.

3. The apparatus in accordance with claim 1, in which said peeling mechanism includes a relatively stationary knife positioned to engage an onion on said spindle and to score the peel of the same equatorially as the spindle rotates on its own axis.

DAVID L. TAYLOR.

REFERENCES CITED

The following references are of record in the file of this patent:

UNITED STATES PATENTS

| Number | Name | Date |
|---|---|---|
| 287,601 | Wilcox | Oct. 30, 1883 |
| 473,838 | Harding | Apr. 26, 1892 |
| 899,340 | Simpson | Sept. 22, 1908 |
| 1,114,070 | Trust | Oct. 20, 1914 |
| 1,347,385 | Kirino | July 20, 1920 |
| 1,451,571 | Gay | Apr. 10, 1923 |
| 1,720,468 | Combest | July 9, 1929 |
| 1,726,722 | Sleeper | Sept. 3, 1929 |
| 1,995,694 | Urschel | Mar. 26, 1935 |
| 2,286,649 | Rogers | June 16, 1942 |
| 2,299,137 | Geren et al. | Oct. 20, 1942 |
| 2,329,555 | Polk, Sr. | Sept. 14, 1943 |
| 2,403,516 | Gaddini | July 9, 1946 |
| 2,445,881 | Hemmeter | July 27, 1948 |
| 2,494,914 | Urschel et al. | Jan. 17, 1950 |